(No Model.)
W. J. ACHESON.
ATTACHMENT FOR BICYCLES.
No. 515,892. Patented Mar. 6, 1894.
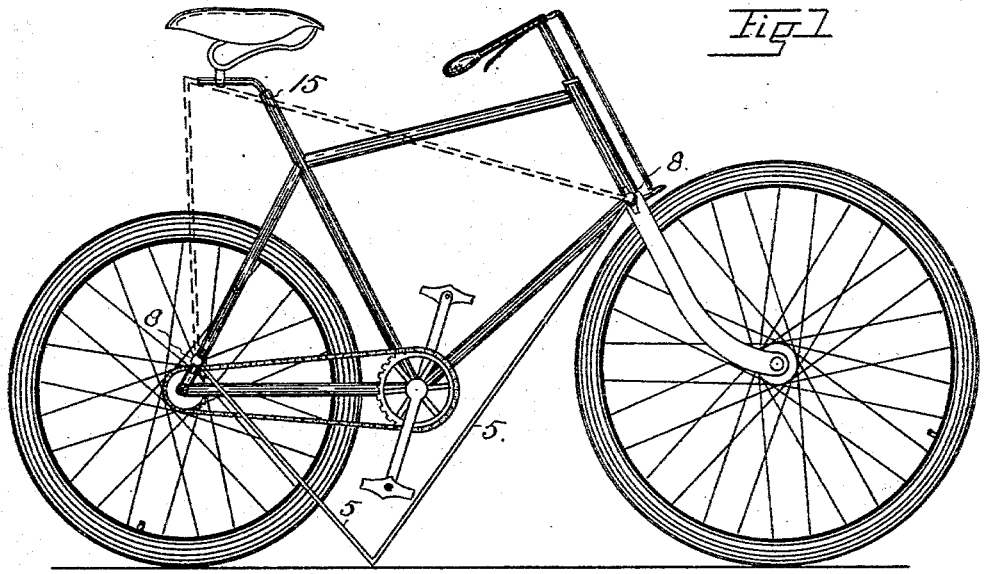
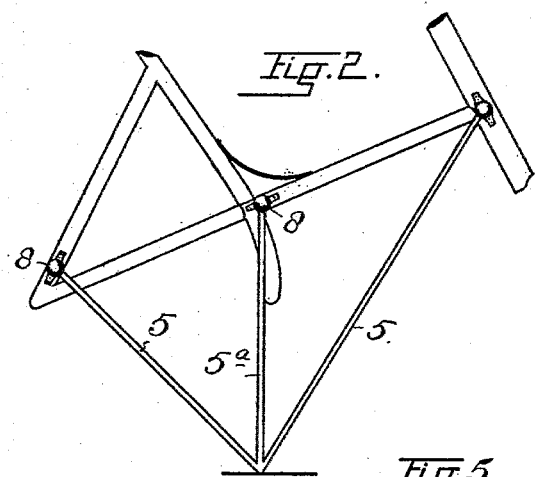
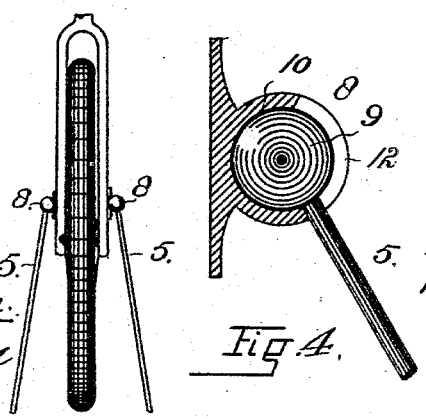
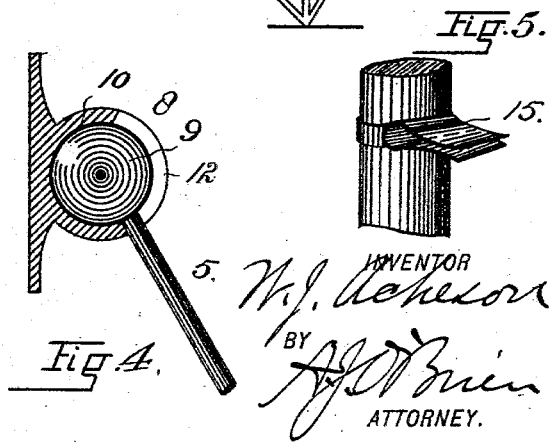
WITNESSES:
C. J. Rollauer
Chas. E. Dawson
INVENTOR
W. J. Acheson
BY
H. J. O'Brien
ATTORNEY.

UNITED STATES PATENT OFFICE.

WILLIAM J. ACHESON, OF DENVER, COLORADO, ASSIGNOR TO ANNIE A. CHAPIN, OF SAME PLACE.

ATTACHMENT FOR BICYCLES.

SPECIFICATION forming part of Letters Patent No. 515,892, dated March 6, 1894.

Application filed March 13, 1893. Serial No. 465,832. (No model.)

*To all whom it may concern:*

Be it known that I, WILLIAM J. ACHESON, a citizen of the United States of America, residing at Denver, in the county of Arapahoe and State of Colorado, have invented certain new and useful Improvements in Attachments for Bicycles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved attachment for bicycles and consists of the features hereinafter described and claimed.

The improvement will be fully understood by reference to the accompanying drawings, in which is illustrated an embodiment thereof.

In the drawings, Figure 1 is a side view of a bicycle showing the attachment in place. Fig. 2 illustrates a modified form of construction. Fig. 3 is a fragmentary end view of a bicycle, illustrating the attachment. Fig. 4 is an enlarged detail view, illustrating a suitable joint for connecting the attachment with the bicycle frame. Fig. 5 is a detail view, illustrating the locking clip.

In Fig. 1 of the drawings, I have shown what I consider the preferred form. In this case the supporting brace is composed of two arms 5 attached to the frame at suitable points in the front and rear by means of a joint 8. As shown in the drawings, a sort of ball and socket joint is employed. The arms of the frame are provided with spherical or ball shaped extremities 9, received within counterpart stationary sockets 10 formed on the frame. These sockets are slotted to permit the required movement of the braces in shifting them from one position to the other. The outer extremities of arms 5 are so connected as to form an integral brace. It is intended that one of these braces shall be attached to each side of the machine as shown in Fig. 3. As shown in Fig. 2, a third or auxiliary arm 5ª is added to the brace, said arm occupying a position between the arms 5. When the brace is composed of more than one arm, it may be turned upward to the position shown by dotted lines in Fig. 1, and locked in any suitable manner. The locking means shown in the drawings consists of a spring clip or catch 15, shown in detail and on an enlarged scale in Fig. 5. This clip consists of two jaws secured to the frame of the machine and adapted to grip one arm of the brace tightly as it is forced between them. Of course any other suitable means may be employed for locking the brace in the upraised position.

Having thus described my invention, what I claim is—

1. The combination with a bicycle, of a movable supporting brace having two arms attached to the frame in front and rear and connected at their free extremities, the apex of the brace being adapted to engage the surface upon which the bicycle stands, thus forming a lateral support, and at the same time preventing the machine from moving either forward or backward, substantially as described.

2. The combination with a bicycle of a movable supporting brace attached to the frame on either side of the machine, each brace being provided with two arms attached to the frame in front and rear, their free extremities being united, whereby the machine is braced in all directions, and means for locking the upraised braces of the machine when not in use, substantially as described.

In testimony whereof I affix my signature in presence of two witnesses.

WILLIAM J. ACHESON.

Witnesses:
WM. McCONNELL,
CHAS. E. DAWSON.